United States Patent Office 3,369,465
Patented Feb. 20, 1968

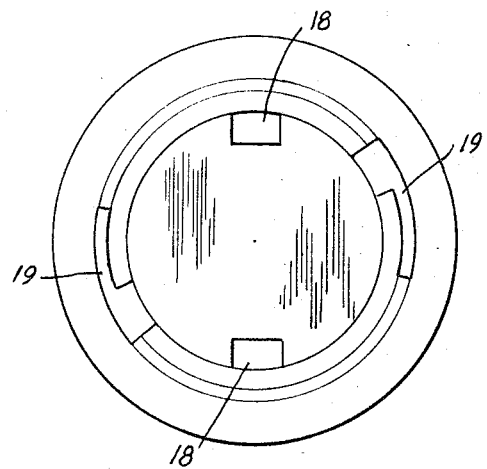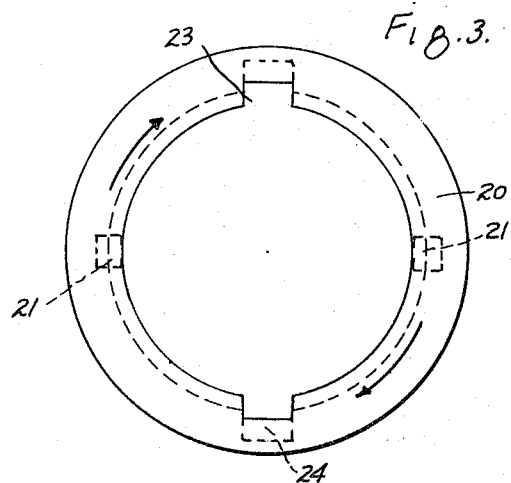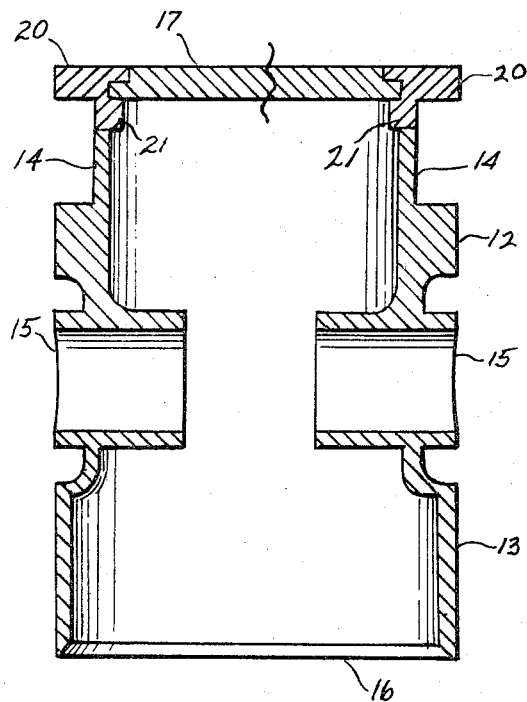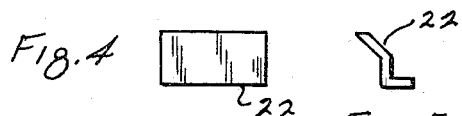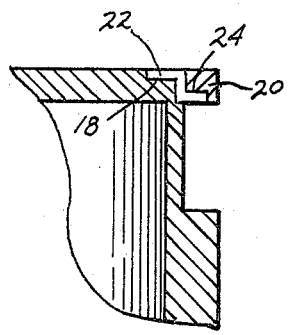

3,369,465
PISTONS FOR INTERNAL COMBUSTION
ENGINES
John L. Harrah, 79 W. Glendale St.,
Bedford, Ohio 44014
Filed Feb. 8, 1965, Ser. No. 431,099
1 Claim. (Cl. 92—218)

This invention relates broadly to improvements in pistons for use in internal combustion engines.

The primary purpose of the present invention is the provision of an improved form of piston construction whereby the piston packing may be removed, overhauled and replaced from the top of the motor without disturbing the other finished parts of the engine.

As it is well known and also shown in many automotive magazines the piston rings soon gather carbon, resin and other foreign substances and they lose their resiliency and become a sludged weight.

Another purpose of the invention is to provide a piston that will fit in the cylinder with a relatively close tolerance thereby to prevent loss of compression pressure and blow-by due to leakage between the pistons and the cylinder walls and also to retain the motor oil in the crank case.

Another purpose of the invention is the provision of a removable retaining ring to operate in conjunction with an improved form of piston packing thereby to form a sealing relation against the cylinder walls of the internal combustion engine.

Another purpose of the invention is to provide a light, inexpensive and simplified retaining ring, one that will be facile in operation and also one to hold the improved piston assembly in position around the piston.

Another purpose of the invention is to provide a holding clip being capable of preventing accidental movement of the retaining ring positioned around the top of the piston.

The pistons having the detachable retaining ring are especially adapted for use in automobile, commercial and industrial trucks, local and long distance trucks and busses, taxi cabs, police cruisers, diesel, road and farm machine and other engines which are run over long periods of time.

By repacking and overhauling the pistons from the top of the motor is will be easier, cleaner and less expensive to do and it will only for a relatively short time tie up much needed equipment.

These and other objects as well as the nature and advantages of the invention will be more readily apparent from the following description taken in connection with the accompanying drawings and in which:

FIGURE 1 is a top plan view of the piston, FIGURE 2 is a cross sectional view of the same taken on line 2—2 of FIGURE 1. FIGURE 3 is a top plan view of a retaining ring. FIGURE 3–B is a fragmentary cross sectional view of the retaining ring taken on line 4—4 of FIGURE 3. FIGURE 4 is a top plan view of a holding clip. FIGURE 5 is an end plan view of the same and FIGURE 6 is a fragmentary sectional view of the piston and retaining ring with the holding clip placed therebetween.

Referring more particularly to the drawings and in FIGURES 1 and 2 a piston 12 is shown. Said piston 12 consists of a main body being of substantially thick, hollow, cylindrical construction having a skirt 13 with a reduced area 14 extending circumferentially thereon and having wrist pin bosses 15 positioned immediately above said skirt 13. Said piston 12 having one open end 16 and one closed end 17.

In FIGURE 1 in the drawings it can be seen that a top plan view of the piston 12 is shown. The top or closed end 17 of the piston 12 is selectively possessed with correlating apertures 18. Said apertures 18 are shaped somewhat rectangularly and extend downwardly a short distance. The purpose of said apertures 18 is to receive the ends of said holding clip 22. The two sets of dotted lines 28 in FIGURE 1 indicate the closed engagement of the lugs 21 of the retaining ring 20 and the annular grooves 19 of the piston 12.

The upper peripheral surface of said reduced area 14 The upper outer peripheral surface of said piston top 17 selectively has two annular grooves 19 for the purpose of receiving the lugs 21 of a retaining ring 20.

In FIGURE 3 a retaining ring 20 is shown. Said ring 20 being of substantially thick annular construction with its inside peripheral surface having correlating lugs 21 extending outwardly therefrom. Said lugs 21 being indicated with dotted lines in FIGURE 1, being engaged with said piston grooves 19. Each of the sides and the bottom surface of said ring 20 has cut out sections 23 and 24 for the purpose of securely holding a retaining clip in position. Said ring 20 being so proportioned to be slidably engaged around the top of the reduced area 26 of said piston 12. When said retaining ring 20 is lowered down around the piston top 17 its stepped in section overlaps the piston top, as indicated with dotted lines at 26 in FIGURE 2.

In FIGURES 4 and 5 a holding clip 22 is shown. Said clip 22 is of substantially strong metal capable of being bent into a holding position. It is shown in FIGURE 5 with its top section being in an inclined position and its lower section in a horizontal position.

Said holding clip 22 is further illustrated in FIGURE 6 whereby the holding clip is received in the space which is provided in said retaining ring 20 and indicated with numerals 23 and 24. When said clip 22 is in this position it will prevent said retaining ring 20 from accidental rotation on said piston 12.

One method of assemblying the piston 12 and the retaining ring 20 is shown in FIGURE 6. Said ring 20 is lowered down around the top of the piston. Said grooves 19 and lugs 21, and said apertures 18 and holding clip 22 are out of register. As shown by the arrows rotate said ring 20 to the right thus bringing said lugs, apertures and holding clip into register. Said holding clip 22 being in an inclined position is in register with said piston top apertures 18. Securely tap said holding clip 22 into and flush with said apertures 18.

To remove, force said clips 22 back to their inclined position, rotate said retaining ring 20 back out of register and lift up thereby revealing said reduced area 14 which is provided to receive the improved form of piston packing.

Having described one method of employing my invention it is known that certain changes may be made without departing from the scope and the appended claims.

What I claim as new and desire to secure by Letters Patent is:

1. A piston having a cylindrical main body having a skirt with wrist pin bosses positioned immediately above said skirt, said piston being closed at one axial end and open at the opposite end and having a reduced area smaller in diameter than said skirt and extending immediately above said wrist pin bosses, said reduced area to receive an improved form of piston packing, the upper outer peripheral surface of said reduced area having two relatively short annular grooves, the top surface of said piston having shallow rectangularly shaped recesses; an annular retaining ring having tongue-like lugs extending inwardly and downwardly therefrom and having recessed sections on the inside and bottom surfaces; a holding clip placed in said recessed sections of said retaining ring; said retaining ring with holding clip being received on said reduced area of said piston top with said lugs and holding clip out of register with said annular grooves and shallow recesses, said retaining ring with holding clip being rotated to bring said lugs and holding clip into register with said grooves and one of said recesses and being locked against rotation on said piston top by the bending of said holding clip into said shallow recess such that said clip is flush with said piston top.

References Cited

UNITED STATES PATENTS

| | | | |
|---|---|---|---|
| 763,821 | 6/1904 | Wesson | 151—53 |
| 1,368,167 | 2/1921 | Laneville | 92—218 |
| 2,361,095 | 10/1944 | Harrah | 92—218 |
| 2,409,852 | 10/1946 | Harrah | 92—160 |
| 2,925,955 | 2/1960 | Carroll | 29—513 X |
| 3,061,338 | 10/1962 | Clark | 29—513 X |
| 3,212,410 | 10/1965 | Harrah | 92—218 |

FOREIGN PATENTS

| | | |
|---|---|---|
| 123,439 | 2/1947 | Australia. |
| 518,454 | 2/1940 | Great Britain. |

MARTIN P. SCHWADRON, *Primary Examiner.*

G. N. BAUM, *Assistant Examiner.*